(12) United States Patent  
Dennis, Jr. et al.

(10) Patent No.: US 9,297,685 B2  
(45) Date of Patent: Mar. 29, 2016

(54) ROBUST OIL LEVEL SENSOR

(75) Inventors: Paul G. Dennis, Jr., Roscoe, IL (US); Henry R. Vanderzyden, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1845 days.

(21) Appl. No.: 12/351,101

(22) Filed: Jan. 9, 2009

(65) Prior Publication Data  
US 2010/0175471 A1 Jul. 15, 2010

(51) Int. Cl.  
*G01F 23/24* (2006.01)

(52) U.S. Cl.  
CPC .................................... *G01F 23/246* (2013.01)

(58) Field of Classification Search  
USPC ............................................... 73/304 R, 295  
See application file for complete search history.

(56) References Cited

U.S. PATENT DOCUMENTS

| | | | |
|---|---|---|---|
| 3,836,775 A * | 9/1974 | Ridgway | 250/305 |
| 4,476,714 A | 10/1984 | Barry et al. | |
| 4,806,847 A * | 2/1989 | Atherton et al. | 73/304 C |
| 4,827,769 A | 5/1989 | Riley et al. | |
| 4,845,469 A * | 7/1989 | Benda | 340/450.3 |
| 4,939,455 A | 7/1990 | Tsugawa | |
| 4,947,116 A | 8/1990 | Welcome et al. | |
| 5,046,583 A | 9/1991 | Sasaki et al. | |
| 5,057,813 A | 10/1991 | Sasaki et al. | |
| 5,062,277 A | 11/1991 | Heitmann et al. | |
| 5,804,712 A | 9/1998 | Staerzl | |
| 6,498,451 B1 * | 12/2002 | Boules et al. | 318/661 |
| 6,688,184 B2 | 2/2004 | Army, Jr. et al. | |
| 6,791,228 B2 * | 9/2004 | Hashiba et al. | 310/201 |
| 7,263,905 B2 | 9/2007 | Seffernick et al. | |

* cited by examiner

*Primary Examiner* — Hezron E Williams  
*Assistant Examiner* — Gedeon M Kidanu  
(74) *Attorney, Agent, or Firm* — Carlson, Gaskey & Olds, PC

(57) ABSTRACT

An oil level sensor comprises a body having a probe extending away from a nominal body portion. The probe receives a resistance thermal device and extends for a height away from the nominal surface. The probe has an outer dimension. The ratio of the outer dimension to the height is between 0.1 and 0.2. The RTD is connected to lead wires through splices, the lead wires leaving the nominal housing. A fastener tab extends away from the nominal body, and generally perpendicularly to the probe. The lead wires are anchored within a chamber, which is filled with a potting material.

14 Claims, 2 Drawing Sheets

ROBUST OIL LEVEL SENSOR

BACKGROUND OF THE INVENTION

This application relates to an oil level sensor that is made to be robust such that it will operate reliably.

Oil level sensors are utilized to ensure a minimum quantity of oil for critical applications. As one example, a gear box for a starter generator on an aircraft must have a proper supply of oil.

Oil level sensors have often been utilized in these applications. One proposed oil level sensor has a tab extending away from a probe. The tab receives a fastener to connect the sensor to a wall of the gear box. The probe extends away from the tab, and into the oil. A resistance thermal device (RTD) is mounted within the probe. Current is passed through the RTD, and the RTD quickly heats. Oil outwardly of the probe cools the probe. However, in the absence of oil, the increased heat will be detected.

The prior proposed probe utilized a shrink wrap over the splice connection between the RTD and the wires leaving the housing of the sensor. The shrink wrap restricted the potting compound from firmly holding the wires, resulting in unsupported wires that broke in high a vibration and/or thermal cycling environment. In addition, the wires leaving the housing had electrically conductive anchors that were crimped to the wires and located near an opening through which they left the housing wall. At times these anchors caused cold flow of the wire insulation, which coupled with the anchor location being near the exit hole, the wires could short to the housing of the sensor. Also, the probe was undesirably thin compared to a height of the probe allowing normal handling during manufacturing and assembly to flex the probe potentially causing breakage of the RTD or wires within the sensor.

SUMMARY OF THE INVENTION

An oil level sensor comprises a body having a probe extending away from a nominal body surface. The probe receives a resistance thermal device (RTD) and extends for a height away from the nominal surface. The probe has an outer dimension. The ratio of the outer dimension to the height is between 0.1 and 0.2. The RTD is connected to lead wires through splices. The lead wires leave the body to extend to a control. The lead wires are anchored internally within a chamber inside a body, which is filled with a potting material. A fastener tab extends away from the body, and generally perpendicularly to the probe.

These and other features of the present invention can be best understood from the following specification and drawings, the following of which is a brief description.

DETAILED DESCRIPTION OF THE PREFERRED EMBODIMENT

Figure 1:
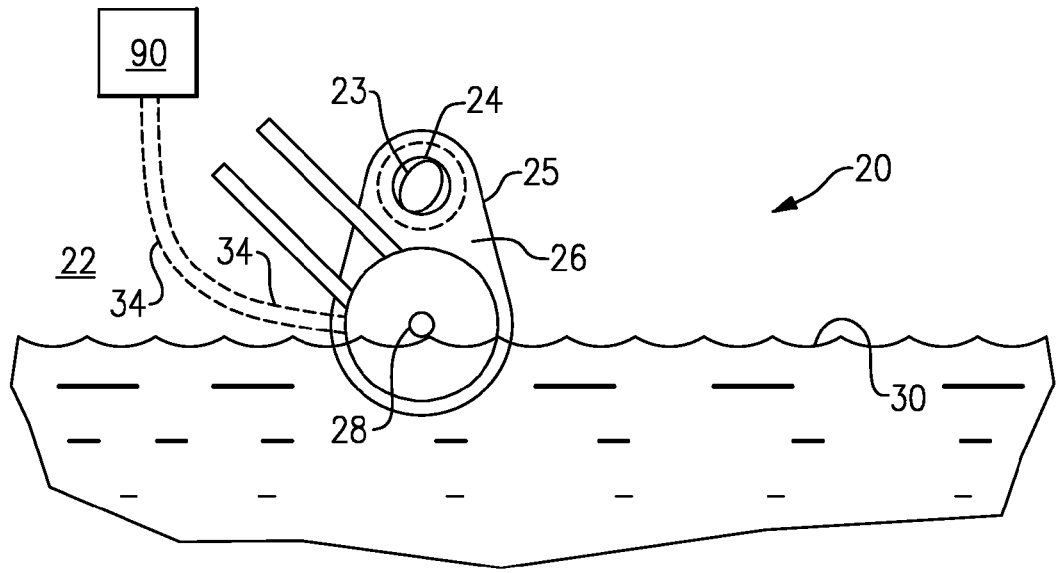
FIG. 1 shows the oil level probe mounted in a gear box.

FIG. 1 shows a gear box 20. Gear box 20 may be part of an aircraft starter generator. A wall 22 receives a sensor body 26, with a fastener 23 of some sort extending through a hole 24 in a mount tab 25.

A probe 28 extends away from the body 26. As shown, the probe 28 is positioned such that it extends into an oil level 30. If the oil level 30 drops below the position of the probe 28, then an undesirably low oil level will be detected. Essentially, wires 34 within the sensor communicate to a control 90, shown schematically in FIG. 1. Increased heat at the probe 28 is detected by control 90.

Figure 2:
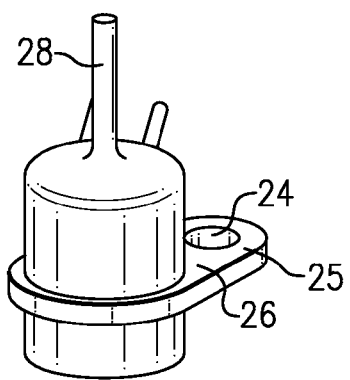
FIG. 2 is a perspective of the oil level probe.

FIG. 2 is a schematic view of the sensor body 26 and shows the probe 28, the mounting tab 25, and the hole 24.

Figure 3:
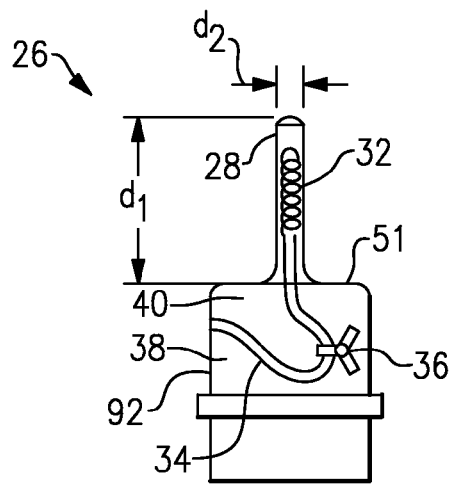
FIG. 3 is a cross-section through the oil level probe.

As shown in FIG. 3, the probe 28 extends for a height d1 above a top surface 51 of a body 92 of the sensor 26. The probe has a nominal diameter d2.

An RTD 32 is mounted within the probe and connected to two wires 34, only one of which is illustrated, which extend outwardly of the body 92 of the sensor. The lead wires 34 are secured internally via an anchor 36 within a chamber 40 inside a body 92, which is filled with a potting material 38. Each of the wires 34 will have an anchor 36.

Figure 4A:
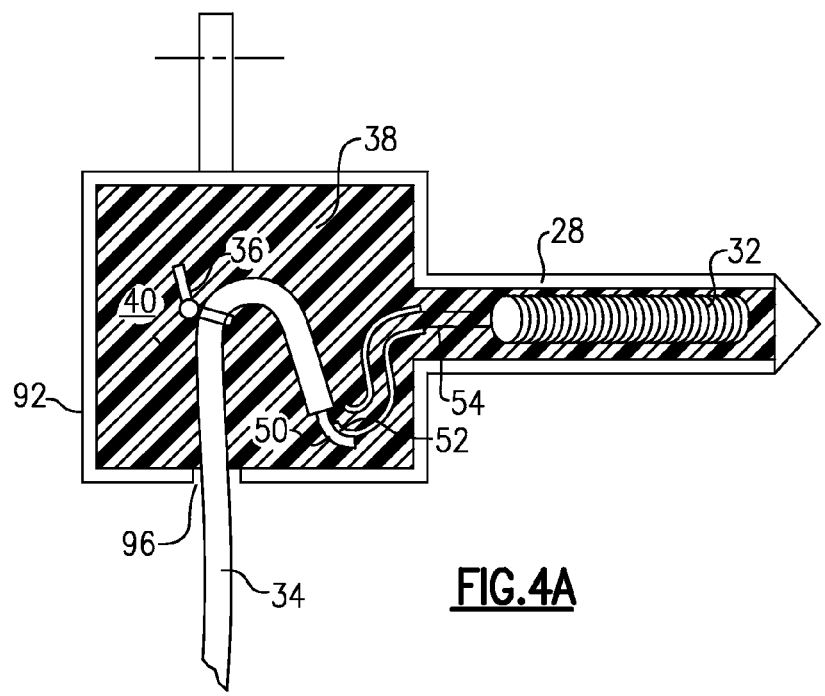
FIG. 4A shows internal details of one embodiment.
Figure 4B:
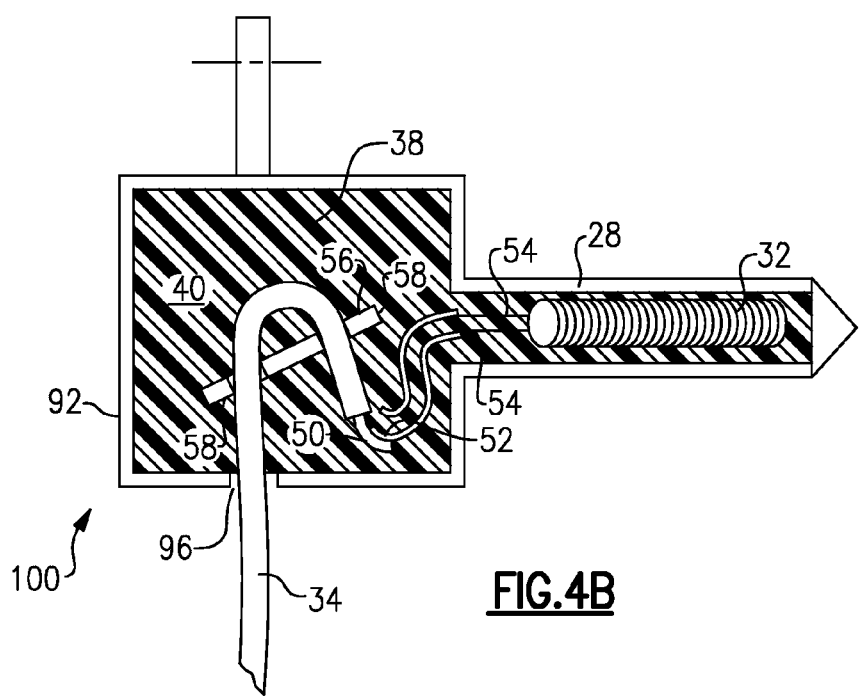
FIG. 4B shows internal details of a second embodiment.

The details of the mounting of the wires to the housing are as shown in FIGS. 4A and 4B. As shown, the RTD has its fine wires 54 connected through splices 52 to ends 50 of the larger lead wires 34. Although only one of the two wires 34 is shown connected in this manner, this is only for illustration simplicity. It should be understood that both wires 54 would include splices 52 connected to lead wires 34. In addition, the lead wires 34 are routed through an anchor 36, which can be tied around the wire, and then secured in the potting compound 38 within chamber 40 of housing 92. As shown, in this manner, the wire is anchored within a chamber 40 of the housing 92. The chamber 40 is filled with a potting material. As can be appreciated from both FIGS. 4A and 4B, an exit opening 96 leaves the housing 92. The wires 34 are not attached to this exit opening directly. Rather, they are secured by the potting material in the chamber 40.

A second embodiment 100 is illustrated in FIG. 4B. This embodiment is similar to the FIG. 4A embodiment, however, a distinct type anchor 56 having holes 58 to allow the wire 34 to pass into and then back out of the anchor 56 is utilized. Again, the anchor 56 is held within the potting compound 38 within the chamber 40 of the body 92. While only one wire 34 is illustrated as being anchored, they will both be anchored in a disclosed embodiment.

Either of the anchors 36 and 56 are preferably formed of a non-conductive material. The material for the insulation of the wires is such that the potting material does not necessarily adhere well to the material. The use of the non-conductive anchors secures the wires, and the anchors do adhere well to the potting material such that the wire is firmly secured within the potting material.

In one embodiment of this invention, the height d1 of the probe 28 was 0.66" (17 mm). The diameter d2 of the probe was 0.098" (2.5 mm). Thus, a ratio of d2 to d1 for this particular embodiment was 0.148. In embodiments of this invention, it is preferred that the ratio of d2 to d1 be between 0.1 and 0.2. The probe inside diameter must be large enough to accept the RTD and have at least 0.001" (0.025 mm) clearance between the probe internal wall and the RTD. The response time of the sensor is faster with a thin walled probe, but the probe wall must be thick enough to prevent flexure and subsequent potential breakage of the RTD or wires within the sensor. To reduce response time, it is desirable to locate the probe away from the main body of the sensor which can act as a heat sink, but it is desirable to have a short, stiff probe in a high vibration environment. The probe length of 0.660" and an outside diameter of 0.098" mentioned above has been tested with good results. The RTD has an outer diameter of 0.078" (2.0 mm) in this embodiment.

In the prior art probe as mentioned in the Background of the Invention section, the d1 height was also 0.66" (17 mm), however the d2 diameter was 0.078" (2.0 mm). Thus, the ratio of d2 to d1 was 0.118.

The potting material is preferably a highly filled epoxy. In embodiments, an epoxy available under the trade name Stycast™, and in particular Stycast 2762FT or Stycast 2762 are utilized. The RTD preferably has a dielectric coating with a nominal thickness of at least 0.002" (0.051 mm). This thicker dielectric coating prevents contact of the RTD coil to the probe inside diameter.

The size of the fine wires 54 may be on the order of 0.010" (0.25 mm). The splices 52 would be on the order of 0.013" (0.33 mm), and the wire 34 is on the order of 0.040" (1.0 mm). That is, the splices 52 are of an intermediate size between the fine wire 54 and the wire 34.

The housing may be formed of a titanium material to reduce weight.

While the application specifically discloses an oil level sensor utilized to identify a minimum quantity of oil, other applications may be an oil level sensor utilized to detect too high a level of oil. Further, the oil level sensors can be embodied into one housing or multiple housings as is required.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An oil level sensor comprising:
   a sensor having a body and a probe extending away from a top surface of said body, said probe receiving a resistance thermal device, said probe extending for a height away from said top surface, and said probe having an outer dimension, a ratio of the outer dimension to the height being between 0.1 and 0.2;
   said resistance thermal device having fine wires connected to lead wires through splices, and said lead wires leaving said body;
   a fastener tab extending away from said body;
   said lead wires being anchored within a chamber defined by said body, said chamber being filled with a potting material; and
   said probe body having an exit opening for said lead wires to extend outwardly thereof, and said lead wires not being secured directly to said body at said exit opening, but instead held by said potting material, with an anchor being positioned between said opening and said resistance thermal device.

2. The oil level sensor as set forth in claim 1, wherein a non-conductive anchor includes a tie that ties around each of said lead wires, and is internally secured within said potting material.

3. The oil level sensor as set forth in claim 1, wherein a non-conductive anchor includes at least two holes, and each of said lead wires moving through each of said at least two holes in said anchor, said anchor being secured internal within said potting material.

4. The oil level sensor as set forth in claim 1, wherein said potting material is a highly filled epoxy.

5. The oil level sensor as set forth in claim 1, wherein said lead wires are fully supported by potting compound within the sensor.

6. An oil level sensor comprising:
   a sensor having a probe extending away from a top surface of a body, said probe receiving a resistance thermal device, said probe extending for a height away from said top surface, and said probe having an outer dimension, a ratio of the outer dimension to the height being between 0.1 and 0.2;
   said resistance thermal device having fine wires connected to lead wires through splices, and said lead wires leaving said body;
   a fastener tab extending away from said body, and generally perpendicularly to said probe;
   said lead wires being anchored within a chamber defined by said body, said chamber being filled with a potting material, said potting material being a highly filled epoxy; and
   said body having an exit opening for said lead wires to extend outwardly of, and said lead wires not being secured directly to said housing at said exit opening, but instead held by said potting material, with a non-conductive anchor being positioned between said opening and said resistance thermal device.

7. The oil level sensor as set forth in claim 6, wherein the non-conductive anchor includes a tie that ties around each of said lead wires, and is secured internally of said body within said potting material.

8. The oil level sensor as set forth in claim 6, wherein the non-conductive anchor includes a securement member having at least two holes, and each of said lead wires moving through each of said at least two holes in said anchor, said anchor being secured within said potting material.

9. The oil level sensor as set forth in claim 6, wherein said lead wires are fully supported by potting compound within the sensor.

10. A gear box comprising:
    a chamber for holding a quantity of oil; and
    an oil level sensor received in said chamber, said oil level sensor having a probe extending away from a top surface of a body, said probe receiving a resistance thermal device, said probe extending for a height away from said top surface, and said probe having an outer dimension, a ratio of the outer dimension to the height being between 0.1 and 0.2;
    said resistance thermal device having fine wires connected to lead wires through splices, and said lead wires leaving said body;
    a fastener tab extending away from said body;
    said lead wires being anchored within a chamber defined by body, said chamber being filled with a potting material; and
    said body having an exit opening for said lead wires to extend outwardly of, and said lead wires not being secured directly to said housing at said exit opening, but instead held by said potting material, with an anchor being positioned between said opening and said resistance thermal device.

11. The gear box as set forth in claim 10, wherein a non-conductive anchor includes a tie that ties around each of said lead wires, and is internally secured within said potting material.

12. The gear box as set forth in claim 10, wherein a non-conductive anchor includes at least two holes, and each of said lead wires moving through each of said at least two holes in said anchor, said anchor being secured within said potting material.

13. The gear box as set forth in claim 10, wherein said potting material is a highly filled epoxy.

14. The oil level sensor as set forth in claim 10, wherein said lead wires are fully supported by potting compound within the sensor.

\* \* \* \* \*